United States Patent
Eck et al.

(10) Patent No.: US 10,963,051 B2
(45) Date of Patent: Mar. 30, 2021

(54) HYBRID HAPTIC INTERFACE WITH IMPROVED HAPTIC FEEDBACK

(71) Applicant: COMMISSARIAT A L'ENERGIE ATOMIQUE ET AUX ENERGIES ALTERNATIVES, Paris (FR)

(72) Inventors: Laurent Eck, Saint Lubin de la Haye (FR); Moustapha Hafez, Arcueil (FR); Romain Lejas, Viry Chatillon (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 0 days.

(21) Appl. No.: 15/765,748

(22) PCT Filed: Oct. 6, 2016

(86) PCT No.: PCT/EP2016/073839
§ 371 (c)(1),
(2) Date: Apr. 4, 2018

(87) PCT Pub. No.: WO2017/060330
PCT Pub. Date: Apr. 13, 2017

(65) Prior Publication Data
US 2018/0284891 A1     Oct. 4, 2018

(30) Foreign Application Priority Data

Oct. 6, 2015  (FR) ........................................ 1559502

(51) Int. Cl.
*G06F 3/01*       (2006.01)
*G05G 1/08*       (2006.01)
(Continued)

(52) U.S. Cl.
CPC ............... *G06F 3/016* (2013.01); *G05G 1/08* (2013.01); *G05G 5/03* (2013.01); *H01H 2003/008* (2013.01)

(58) Field of Classification Search
CPC .. G06F 3/016; G06F 3/0362; G06F 2203/015; G06F 3/0338; G06F 3/038;
(Continued)

(56) References Cited

U.S. PATENT DOCUMENTS 6,283,859 B1 * 9/2001 Carlson .................. B62D 5/006
188/267.1
2007/0279401 A1   12/2007 Ramstein et al.
(Continued)

FOREIGN PATENT DOCUMENTS

| EP | 1698538 A1 | 9/2006 |
| FR | 3010550 A1 | 3/2015 |
| WO | 2015/033034 A1 | 3/2015 |

OTHER PUBLICATIONS

International Search Report dated Dec. 14, 2016, in PCT/EP2016/073839, filed Oct. 6, 2016.
(Continued)

*Primary Examiner* — Gerald Johnson
(74) *Attorney, Agent, or Firm* — Oblon, McClelland, Maier & Neustadt, L.L.P.

(57) ABSTRACT

A haptic interface including: a button that can be rotated by a user; an interaction element for interaction with a magneto-rheological fluid, secured to the button; a mechanism for measuring a current position of the button; a brake including a magneto-rheological fluid and a system for generating a magnetic field in the fluid; a rotary electric motor including a shaft secured in rotation to the button; a control unit generating orders for the magnetic field generating system and for the motor; and a mechanism detecting the user's intention for action on the button, the control unit
(Continued)

controlling generation of a magnetic field and/or the motor based on the information obtained on the detection mechanism.

18 Claims, 6 Drawing Sheets

(51) Int. Cl.
*G05G 5/03* (2008.04)
*H01H 3/00* (2006.01)

(58) Field of Classification Search
CPC ............ A63C 5/06; A61B 2017/00039; A61B 2017/00876; H01H 2003/008
See application file for complete search history.

(56) References Cited

U.S. PATENT DOCUMENTS

| | | | |
|---|---|---|---|
| 2011/0128135 A1* | 6/2011 | Periquet | F16F 9/535 340/407.2 |
| 2012/0276309 A1* | 11/2012 | Failing | A63C 5/03 428/34.1 |
| 2014/0165770 A1* | 6/2014 | Abri | A61B 34/30 74/490.01 |
| 2015/0330140 A1* | 11/2015 | Kincaid | E06B 7/28 324/207.12 |
| 2016/0216763 A1* | 7/2016 | Vanhelle | B60K 37/06 |

OTHER PUBLICATIONS

Preliminary French Search Report dated Jul. 5, 2016, in French Patent Application FR 1559502, filed Oct. 6, 2015.
U.S. Appl. No. 14/407,302, filed Jun. 13, 2013, 2015/0162853 A1, Leroy et al.
U.S. Appl. No. 15/514,741, filed Mar. 27, 2017, Eck.
U.S. Appl. No. 15/514,733, filed Mar. 27, 2017, Hafez.
U.S. Appl. No. 15/532,433, filed Jun. 1, 2017, 2017/0269692 A1, Eck et al.

* cited by examiner

HYBRID HAPTIC INTERFACE WITH IMPROVED HAPTIC FEEDBACK

TECHNICAL FIELD AND PRIOR ART

This invention relates to a hybrid haptic interface with improved haptic feed back.

A haptic interface can take the form of a rotating button manipulated by a user, in this case the interface opposes a resistive torque to the user according to the angular position of the actuating button and of the movement applied by the user, as such making it possible to define various haptic patterns which will be felt by the user when the latter turns the button.

The resistive torque can be transmitted to the button by the intermediary of a magneto-rheological fluid of which the apparent viscosity is modified by the application of a magnetic field in order to define the predefined haptic patterns.

Such an interface is said to be passive as it only opposes a force generated by the user. It does not provide more energy than that provided by the user.

Moreover, despite the richness of haptic patterns that can be generated by an interface that implements only a magneto-rheological material fluid, the latter cannot perfectly generate certain specific haptic patterns such as for example a spring effect. When the user forces on the "spring", the passive interface correctly opposes the movement. On the other hand, when the user releases the "spring", the user cannot feel the return force of the spring and the interface does not return to the rest position of the "spring".

There are also haptic interfaces referred to as active that implement an electric motor that can provide a force.

However, a motor of substantial size is required to provide a resistive force equivalent to that of a magneto-rheological fluid interface, such as for example when the interface has to reproduce the haptic sensation of an abutment or of a virtual wall.

The size of the motor can be reduced, but a reduction stage is required in order to obtain an equivalent braking force. Such a reduction stage is harmful to the haptic perception felt, due to the inertia and parasite forces generated and it degrades the "transparency" of the interface In addition, the implementing of an electric motor poses difficulties for translating rapid or fine variations in the force. Vibrations appear or an instability of the control.

Finally, this type of interface can be potentially dangerous for a user if the forces generated by the motor are substantial.

Document EP 1 698 538 describes a hybrid haptic interface comprising an output element which can be for example manipulated directly by the user, an electric motor, a double clutch with magneto-rheological fluid between the electric motor and the output element and a magneto-rheological fluid brake. The motor rotates at a constant speed. Gears make it possible to generate two opposite directions of movement. Each magneto-rheological clutch and the magneto-rheological brake comprise their own seal system, with each one introducing parasite friction which harms the transparency of the interface. Furthermore clutches generate friction. In addition, the motor and the gears rotate permanently, which generates continuous operating noise. The size of the interface is also substantial.

EXPOSURE OF THE INVENTION

It is consequently a purpose of this invention to offer a hybrid haptic interface that offers an improved haptic feedback, in particular a haptic interface capable of reproducing a larger diversity of haptic patterns with a high-quality feeling and with a reasonable size.

The purpose mentioned hereinabove is achieved by a rotating hybrid haptic interface comprising a member for interacting with the user and a member for interacting with un fluid of which the viscosity varies according to a control stimulus, with the two members being secured to each other at least in rotation or at least in translation, means for generating a variable stimulus by modifying the viscosity of the fluid, a rotating electromagnetic actuator coupled directly with the member for interacting with the user, in such a way that the electromagnetic actuator can apply a force in rotation to the element for interaction with the user. The interface also has means for detecting the intention of action of the user before the movement applied to the element for interaction with the user becomes perceptible for the user and for the position measuring sensor, so as to determine the direction of movement that the user has the intention to apply to the element for interaction with the user.

The electromagnetic actuator, for example an electric motor, is active when the haptic pattern to be reproduced so requires; when it is not active, very little parasitic effects are transmitted to the user. The inertia of the interface is therefore increased little in comparison with the inertia of a haptic interface with rheological fluid alone.

Furthermore, since the electromagnetic actuator is directly coupled to the element for interaction with the user, the interface has a certain compactness.

The electromagnetic actuator can advantageously be sized to generate movements with low torque, which allows space to be saved. Indeed, the dissipation of substantial forces obtained using the magneto-rheological brake and the generating of weak forces obtained by a small motor are sufficient to produce a haptic sensation of good quality. There is no need to restore a substantial force to the user by a haptic interface when it has to simulate an element that has stored energy.

Advantageously, the coupling of a passive brake and an electromagnetic actuator makes it possible to reproduce new patterns, such as the "spring" pattern. For example, the brake opposes movement when the user forces on the spring and the electromagnetic actuator simulates the return action of a spring when the force is released.

Furthermore, the variable viscosity fluid brake comprises seals that confine the fluid with variable viscosity in a chamber and which exert on the mobile members a pressure that induces a residual torque, also designated as idling torque. The electromagnetic actuator can advantageously be controlled in order to offset this torque.

Very advantageously, the motor can be used to reposition the element for interaction with the user in an absolute position after, for example, a power cut-off of the device.

Furthermore, the undesirable vibrations mentioned hereinabove due to the implementing of an electric motor control that has to control a very high dynamic of torque do not appear in the interface according to the invention, because only the magneto-rheological fluid brake is used to control a very high dynamic of torque.

The subjection matter of the invention then is a haptic interface comprising:
  an element for interaction with a user able to be moved in a first direction and in a second direction,
  an element for interaction with a fluid of which the viscosity varies according to an external stimulus, with the element for interaction with the fluid being secured at least in translation or at least in rotation to the element for interaction with the user, means for measuring a current angular position of the element for interaction with the user, means for determining the direction of rotation of the element for interaction with the user, a brake comprising a fluid of which the apparent viscosity varies according to an external stimulus and a system for generating said stimulus on control in said fluid, with the element for interaction with the fluid being arranged in the fluid, rotating electromechanical means comprising a shaft secured in rotation to the element for interaction with the user, a control unit that can generate orders for said system for generating said stimulus to modify the value of the stimulus, and to the electromechanical means, means for detecting the torque exerted by a user on the element for interaction with the user, in the case of an element for interaction with the user mobile in rotation, in order to know the direction of torque and if the torque is greater than a given value for a given direction, with the control unit controlling the system for generating said stimulus based on the information obtained on the torque at least when a zero or low speed of the element for interaction with the user is detected.

In an advantageous example, the electromechanical means comprise an electric motor.

Preferably, the means for determining the direction of rotation of the element for interaction with the user are formed by the means for detecting the torque exerted by a user on the element for interaction with the user or use temporal variations of the means for measuring a current angular position of the element for interaction with the user, The means for detecting the torque applied by the user on the element for interaction with the user can comprise two sensors of the deformation caused by the torque to one of the elements of the haptic interface, said deformation sensors being arranged in such a way that a deformation sensor detects the deformation when the torque is applied in the first direction and the other deformation sensor detects a deformation when the torque is applied in the second direction.

In another embodiment, the means for detecting the torque applied by the user on the element for interaction with the user comprise at least one sensor of the deformation caused by the torque this to one of the elements of the haptic interface. Preferably, the means for detecting the torque applied by the user on the element for interaction with the user comprise two sensors of the deformation caused by the torque to one of the elements of the haptic interface, said deformation sensors being arranged in such a way that a deformation sensor detects the deformation when the torque is applied in the first direction and the other deformation sensor detects a deformation when the torque is applied in the second direction.

Preferably, the proof body is made from a material such that the deformation thereof is not perceptible by the user.

The contact between the force sensor or sensors and the proof body can be a point contact.

The haptic interface can comprise a frame whereon are fixed the means for detecting the torque or the force, the proof body being on the one hand secured to the brake and on the other hand secured to the frame in such a way as to be deformed when a torque or a force is applied to the element for interaction with the user.

The force sensor or sensors or the deformation sensor or sensors are advantageously arranged in relation to proof body in such a way that the measuring sensitivity of the force sensors with regards to the torque or the force is maximised.

In an embodiment, the element for interaction with the user is mobile in rotation and is secured to a rotating shaft of longitudinal axis to which the element for interaction with the fluid is secured in rotation, with the rotational torque being determined. The brake can then comprise a cylindrical case with a circular section coaxial to the axis of the rotating shaft, the proof body being cylindrical with a coaxial circular section and coaxially arranged around the case and wherein the force sensor or sensors or the deformation sensor or sensors are arranged on a circle centred on the axis of rotation of the rotating shaft.

In an embodiment, the control unit is configured to generate orders for the electromechanical means to bring the element for interaction with the user to at least one given position.

The control unit can be configured to generate orders for the electromechanical means and for the system for generating said stimulus in such a way that they act simultaneously on the element for interaction with the user.

According to an additional characteristic, the control unit is configured to generate orders for the electromechanical means so that they apply a torque to the element for interaction with the user that offsets the friction applied to the element for interaction with the user.

According to another additional characteristic, the control unit is configured to generate orders for the electromechanical means and for the system for generating said stimulus in such a way that, from at least one given angular position of the element for interaction with the user, the system for generating said stimulus acts and/or the electromechanical means act on the element for interaction with the user, when the element for interaction with the user rotates in a first direction and in a second direction opposite the first direction, in order to oppose the rotation of the element for interaction with the user, and in such a way that the electromechanical means assist the rotation of the element for interaction with the user at least when the latter is pivoted in the first direction or the second direction towards the given angular position.

The control unit can then be configured so that, when the element for interaction with the user is in the given angular position, it generates orders for the electromechanical means and/or for the system for generating said stimulus to apply a non-zero force on the element for interaction with the user. As an alternative, the control unit is configured so that, when the element for interaction with the user is in an angular zone on either side of the given angular position, it generates orders for the electromechanical means and/or for the system for generating said stimulus to not apply any force on the element for interaction with the user. For example, the control unit is configured so that, when the element for interaction with the user is at the ends of the angular zone, it generates orders for the electromechanical means and/or for the system for generating said stimulus to apply a force on the element for interaction with the user.

The means for detecting the torque or the force applied by the user on the element for interaction with the user comprise for example at least one force sensor, preferably mounted pre-stressed.

As an alternative, the means for detecting the torque can comprise at least one sensor of the deformation caused by the torque or the force to one of the elements of the haptic interface.

In an advantageous example, the haptic interface comprises a proof body which is arranged in such a way as to be deformed by the torque applied by the user on the element for interaction with the user, with the means for detecting the torque or the force being in contact with said proof body.

In a preferred embodiment, the fluid is a magneto-rheological fluid and the stimulus is a magnetic field.

Another subject-matter of the invention is a method for controlling a haptic interface according to the invention, comprising the steps:
- measuring the current position of the element for interaction with the user,
- recording said current position in a non-volatile memory,
- measuring the current position of the element for interaction with the user, for example after an interruption in the electrical power of the control unit,
- comparing of the measured current position and the recorded current position,
- controlling electromechanical means so that the measured current position corresponds to the recorded current position.

Another subject-matter of the invention is a method for controlling a haptic interface according to the invention, with the purpose of reproducing a haptic pattern of the spring type, comprising the steps:
- measuring the current position of the element for interaction with the user,
- determining the direction of rotation of the element for interaction with the user,
- controlling electromechanical means for applying a force in the direction of movement of the element for interaction with the user, or
- controlling electromechanical means and/or the system for generating said stimulus in order to apply a force that opposes the movement of the element for interaction with the user.

Another subject-matter of the invention is a method for controlling a haptic interface according to the invention, comprising the steps:
- Controlling electromechanical means for applying a force in the direction of movement of the element for interaction with the user in such a way that the electromechanical means apply a torque that offsets an idling torque exerted on the element for interaction with the user Another subject-matter of the invention is a method for controlling a haptic interface according to the invention, comprising the steps:
- determining the speed of the element for interaction with the user from information provided by the means for measuring the current position on the element for interaction with the user,
- determining the torque applied to the element for interaction with the user,
- determining the current position of the element for interaction with the user,
- if the speed is greater than a given speed, the direction of rotation is that given by the speed and the system for generating a stimulus is controlled in such a way as to apply the recorded haptic pattern for the determined current position and for the determined direction of rotation,
- if the speed is less than a given speed and if the torque or the force is greater than a positive threshold value or less than a negative threshold value, the direction of movement of the element for interaction with the user is deduced from the determined torque or force, and the system for generating a stimulus is controlled in such a way as to apply a stimulus according to the haptic pattern recorded for this current position and for the deduced direction of movement.

For example, when the determined torque is less than a given value, no stimulus is applied to the fluid.

BRIEF DESCRIPTION OF THE DRAWINGS

This invention shall be understood better based on the following description and the annexed drawings wherein.

DETAILED DESCRIPTION OF PARTICULAR EMBODIMENTS

The description that follows describes the example of a rotating haptic interface that implements a magneto-rheological fluid, i.e. of which the apparent viscosity varies according to the magnetic field applied, but the implementing of a electro-rheological fluid, i.e. a fluid of which the apparent viscosity depends on the electric field applied, does not fall outside of the scope of this invention.

Figure 1:
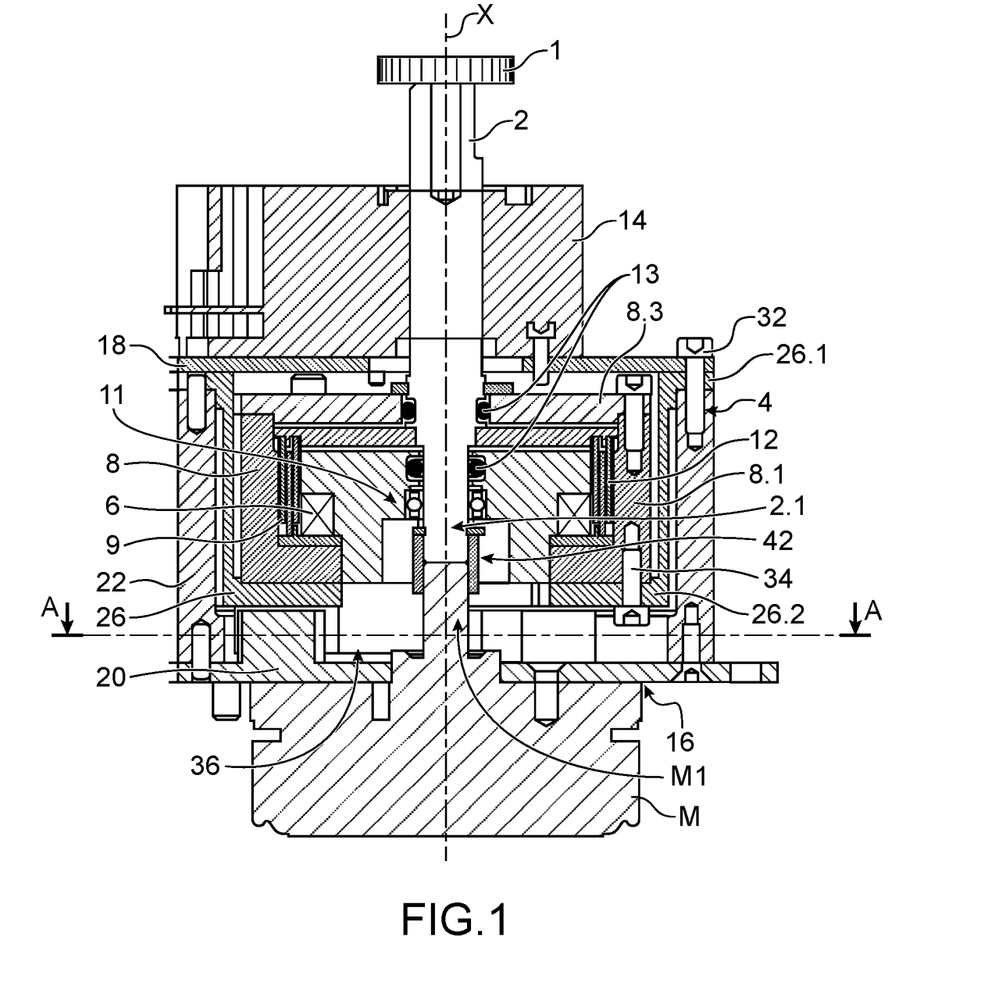
FIG. 1 is a diagrammatical longitudinal section view showing an example of a haptic interface according to the invention.

In FIG. 1, it is possible to see a longitudinal section view of an embodiment of a rotating haptic interface according to the invention.

The haptic interface comprises an element 1 intended to be manipulated by a user and which will be designated in what follows as "button", this button is secured in rotation to a shaft 2 mobile in rotation about the axis X, a device for generating resistive force 4 or magneto-rheological brake opposing the rotation of the shaft 2 and a second device for generating force M formed by an electromagnetic actuator, for example a motor and designated in what follows as "motor". The shaft 2 shall be designated as "actuating shaft 2" in the rest of the description. The electromagnetic actuator can be for example of the direct current electrical machine type, or a synchronous electrical machine, of the "brushless" type for example, which makes it possible to not need brushes and to reduce the inertia of the rotor.

The motor M comprises a motor shaft M1 which is aligned on the longitudinal axis. The shaft M1 comprises a free end arranged facing a free end of the actuating shaft 2. The motor shaft M1 and the actuating shaft 2 are mechanically coupled in such a way as to be secured to one another at least in rotation. A coupling part 42 of the shafts M1 and 2 is mounted around the free ends of the shafts. The coupling part can for example be a ring mounted on the end of the motor shaft M1 and on the end of the actuating shaft 2, with each one of the ends being provided with a flat surface that cooperates with the ring. As an alternative, the shafts can be splined shafts and the ring can have a complementary inside surface.

As a variant, a single shaft can form the shaft 2 and the shaft M1.

As another variant, the motor can have a shaft that exits at each end, with an end of the shaft of the motor being secured to the exiting end of the shaft 2. The button 1 is secured to the end of the shaft of the motor that is not secured to the shaft 2 of the brake. This variant has the advantage of being able to implement a brake with an axis that passes through only a wall of the chamber of the brake, which makes it possible to reduce the number of seals of the brake that provide for the seal of the chamber, and therefore to reduce parasite friction.

The brake 4 comprises a fluid of which the characteristics can be modified using a magnetic field and a system for generating a magnetic field 6 received in a case 8. The fluid is, for example a magneto-rheological liquid. The unit comprising the case, the fluid and the system for generating a magnetic field forms a magneto-rheological brake.

The case 8 delimits a sealed chamber 9 containing the magneto-rheological fluid. All or a portion of this chamber is subjected to a magnetic field generated by the system 6. The case 8 comprises a lateral wall 8.1, a lower bottom 8.2 and an upper bottom 8.3.

The shaft 2 passes through the upper bottom 8.3, the chamber 9 and the lower bottom 8.2. The end 2.1 of the shaft 2, opposite the end bearing the button 1, passes through the lower bottom 8.2 of the case 8 and is guided in rotation by means of a bearing 11. Seals 13, for example O-ring seals, provide the seal between the shaft and the chamber. In the example shown the bearing is arranged outside the sealed zone delimited by the seals 13.

The case 8 delimits a sealed chamber that confines the magneto-rheological fluid.

The brake 4 also comprises an element 12 secured in rotation to the shaft 2 and housed in the sealed chamber 9. This element is able to interact with the magneto-rheological fluid, with the rotation of the element 12 being more or less slowed down by the magneto-rheological fluid according to its apparent viscosity.

In the example shown, the element 12 comprises two concentric lateral walls 12.1, 12.2 with a circular transversal section secured to a bottom 12.3, which itself is secured in rotation to the shaft.

As a variant, the element 12 may comprise only a lateral wall or more than two, concentric lateral walls. As a further variant, the element 12 could be formed by a disc. Moreover, the interaction element could comprise holes and/or protruding portions or as a hollow in order to increase the resistance to movement.

In the example shown, the lower bottom 8.2 of the case 8 has a shape such that the inside volume of the sealed chamber 9 has a shape that corresponds to that of the interaction element 12, which makes it possible to reduce the quantity of fluid required. In the example shown, a cylindrical element 15 with a circular section secured to the case is inserted between the two lateral walls 12.1, 12.2, the latter contributes to the shearing effect of the magneto-rheological fluid when the lateral walls 12.1 and 12.2 are set into rotation.

The lateral walls 12.1, 12.2 of the element 12 can be made from a magnetic or anti-magnetic material.

In the example shown, the system for generating a variable magnetic field 6 comprises a coil fixed on the case and arranged inside the interaction element 12, and a supply of current (not shown) controlled by a control unit according to the manipulation of the button and pre-recorded patterns.

The interface also comprises a position sensor 14 which is, in the example shown, located outside the case and partially secured to the shaft 2. The position sensor 14 makes it possible to measure the current position of the button, which is in the example shown by the current angular position. This can be for example an incremental optical encoder.

The interface also comprises means for detecting the direction of rotation of the element for interaction with the user, these means are for example formed by processing the position information provided by the angular position sensor, which makes it possible to determine the direction of actuating by performing for example a calculation of the difference between an angular position measured at an instant T and a position measured at the instant T+deltaT. In the case where the position sensor is an encoder supplying digital signals in quadrature, for example an incremental optical encoder, the direction of actuating can be determined directly by the analysis of the phase relative to signals in quadrature. The direction of actuating of the button is used for controlling the magneto-rheological brake as well as for controlling the motor. As shall be seen in what follows the interface also comprises a sensor for the torque exerted on the element for interaction with the user, the torque measurements can be used to determine the direction of rotation.

The haptic interface also comprises a frame 16 wherein is arranged the case 8. The frame 16 comprises a first and a second end flange 18, 20 and a lateral wall 22 fixed to the two flanges 18, 20, the first flange 18 is passed through by the rotating shaft and the second flange is passed through by the motor shaft. The position sensor 14 is fixed on the first flange of the frame.

The interface also comprises means for detecting the intention of action of the user, with these means detecting the torque exerted by the user on the button before a movement of the button that can be perceived by the user and by the position sensor is applied to it.

In the example shown, the means for detecting the intention of action of the user comprise a proof body 26, of which the deformation will be detected caused by the torque applied by the user, and force sensors. The proof body is shown alone in FIG. 3. The proof body 26 is fixed by a longitudinal end 26.1 to the frame 16 and by the other longitudinal end 26.2 to the magneto-rheological brake, i.e. to the case 8 in the example shown. The force sensors are in contact with the proof body on its longitudinal end 26.2 secured to the case 8.

Figure 2:
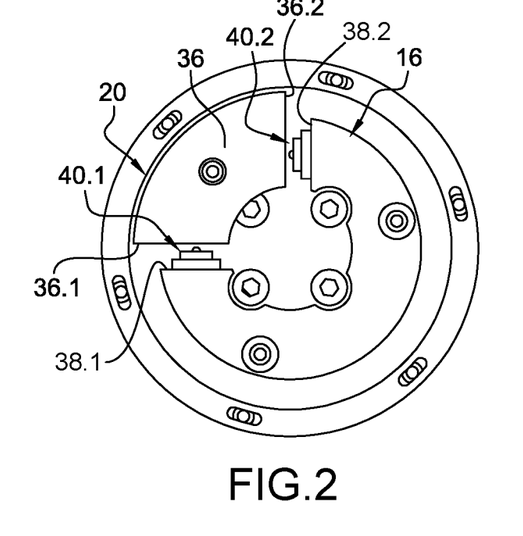
FIG. 2 is a transversal section view along the plane A-A of the interface of FIG. 1.
Figure 3:
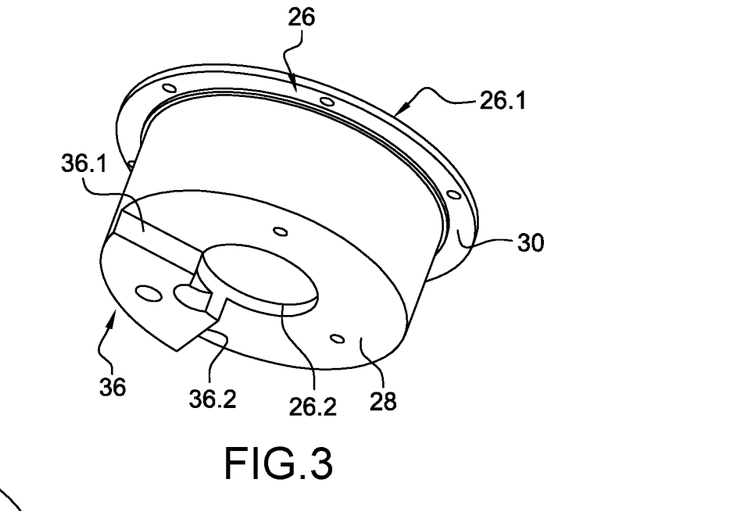
FIG. 3 is a perspective view of an embodiment of a proof body implemented in the interface of FIG. 1.

In the example shown in FIGS. 1, 2 and 3, the proof body 26 comprises a cylindrically-shaped body with circular section closed by a bottom 28 at the longitudinal end 26.2. An annular collar 30 extends radially to the outside on the other longitudinal end 26.1.

The inner diameter of the proof body corresponds to the outer diameter of the case 8, increased by an operating clearance. The bottom of the proof body is arranged between the case and the second flange 20 of the frame 16.

The proof body is secured to the frame by means of at least one screw 32 passing through the flange 18 and the collar 30. In the example shown, the screws 32 are also used to link the flange 18 to the lateral wall 28.

The bottom 28 of the proof body is fixed to the case 8 by at least one screw 34.

The proof body 26 also comprises an element 36 protruding from its longitudinal end 26.2 opposite that in contact with the case. The element 36 is received in a cavity 38 arranged in the flange 20 of the frame.

In the example shown, the protruding element 36 has the form of an angular portion centred on the longitudinal axis. As can be seen in FIG. 2, the angular portion 36 is delimited by two faces 36.1, 36.2. The cavity 38 has a shape corresponding to that of the angular portion 36 and is delimited by two faces 38.1 38.2 each one facing a face 36.1, 36.2 of the angular portion 36. A force sensor 40.1 is mounted on the face 38.1 of the cavity in contact with the face 36.1 of the angular portion and a force sensor 40.2 is mounted on the face 38.2 of the cavity in contact with the face 36.2 of the angular portion 36. A mechanical contact of the point contact type is provided between each force sensor 40.1, 40.2 and the proof body 26. The force sensors 40.1, 40.2 are advantageously mounted pre-stressed.

As such when a torque is applied to the button, the latter causes a deformation by torsion of the proof body 26 by the intermediary of the case 8 itself in interaction with the fluid, itself in interaction with the interaction element 12, itself linked to the shaft 2. This deformation is detected by one or the other of the force sensors 40.1, 40.2 according to the direction of rotation of the button.

The proof body is for example made of plastic material, such as ABS.

The material of the proof body and the geometry thereof can be determined depending on the minimum torque and the maximum torque applied, the sensitivity of the force sensors and the desired detection threshold. Furthermore, the deformation of the proof body is such that it cannot be perceived by the user. For example, it can be considered that a deformation of the proof body by a few microns cannot be perceived by the user.

As a variant, it is possible to measure the forces directly on the case 8 or on the rotating shaft, for this a torque sensor would be implemented. However a torque sensor has a high cost and takes up a substantial amount of space with respect to force sensors. Moreover, a torque sensor supplies a precise and calibrated torque value although this information is not useful in the framework of the invention.

The force sensor is for example made using piezoresistive elements assembled in the form of a Wheatstone bridge, they allow for sensitivity of about a few dozen mV per Newton with a stiffness that is high enough to limit the movement to a few dozen microns at full load. As an alternative, the force sensor or sensors could be replaced with one or several deformation sensors formed, for example, by strain gauges directly applied on the proof body in order to detect the deformation thereof.

As the motor M is mechanically linked to the second flange 16 of the frame, it does not disturb the measurement of the torque on the actuating shaft.

Figure 4:
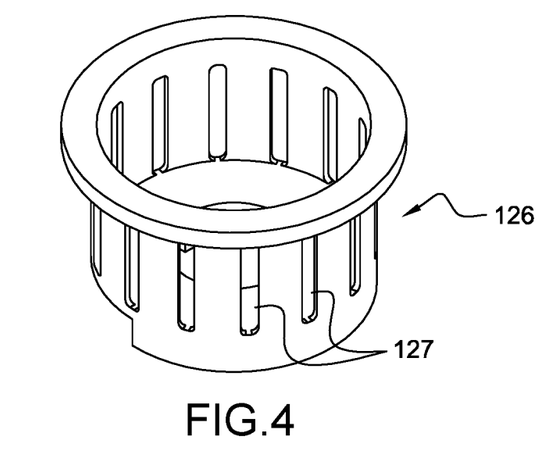
FIG. 4 is a perspective view of another embodiment of a proof body that can be implemented in the interface of FIG. 1.

In FIG. 4, another example can be seen of a proof body 126 of which the general shape is identical to that of the proof body 26, but further comprises longitudinal holes 127 in the lateral wall of the proof body 126. Preferably, the holes 127 are angularly distributed in a regular manner. The proof body has in this embodiment a very high aptitude for deformation. It is for example made of aluminium alloy.

Holes that are inclined with respect to the longitudinal axis and/or that have a shape other than straight for example a curved shape do not fall outside of the scope of this invention. Moreover the holes do not all necessarily have the same dimensions.

Advantageously, means can be provided to amplify the deformation of the proof body under an axial torsion strain while still reducing the deformation of the proof body for any other non-pertinent strain in the framework of the invention, such as for example a radial strain that would be applied to the button parasitically by the user. The sensitivity of the detection is as such improved and the disturbances or false detection can be eliminated.

The proof body example of FIGS. 1 to 4 makes it possible to increase the sensitivity of the measuring device by arranging sensors over the largest diameter possible.

In the example shown and advantageously, the walls 36.1 and 36.2 of the protruding elements are arranged at 90° in relation to one another. This positioning combined with a point contact on force sensors 40.1 and 40.2 makes it possible to break down the deformation strain of the proof body and to favour the sensitivity of the forces according to two orthogonal components located in the plane of the frame 16. As such for example, the sensitivity is substantially reduced for parasitical forces exerted perpendicularly to the plane of the frame 16. In addition, a calculating or algorithmic treatment on the components of the orthogonal forces measured by the sensors 40.1 and 40.2, such as for example a calculated based on the measurement difference between the two sensors weighted by the joint measurement component of the two sensors in the case of a preferred assembly of the sensors with a pre-stressed load, makes it possible to reduce to a certain degree the sensitivity to the parasitic forces exerted parallel to the plane of the frame 16.

The haptic interface also comprises a control unit CU to which are connected the current position sensor, the means for detecting the direction of rotation of the button, the torque sensor, the means for generating the magnetic field and the electric motor. The control unit processes the signals transmitted by the sensors and generates orders for the means for generating the magnetic field and for the electric motor.

An operating example of the device shall now be described.

The user turns the button about its axis in a first direction of rotation and brings it to a defined angular position such as an abutment. A magnetic field is applied to the magneto-rheological fluid in such a way that the variation thereof in apparent viscosity generates a torque on the interaction element with the fluid simulating an abutment on the button in the first direction of rotation.

If the user maintains the force on the button in the first direction of rotation, the proof body 26 is subjected to a torsion torque via the case, itself in interaction with the fluid, itself in interaction with the interaction element 12, itself linked to the shaft 2.

This deformation is measured by the force sensor arranged downstream in the first direction of rotation. Knowing which of the force sensors is solicited makes it possible to know the direction wherein the user has the intention of turning the button. Preferably, it is possible to combine the measurements coming from the two force sensors assembled with a load pre-stress in order to determine the direction wherein the user has the intention to turn the button. The detection of a minimum torque makes it possible to confirm that the user indeed has the intention to pivot the button. It is then deduced therefrom that the user has the intention to maintain the button in abutment. The magnetic field is maintained in such a way as to oppose a force to the movement of the interaction element 12 via the viscous magneto-rheological fluid.

If the user has the intention to turn the button in a second direction opposite the first direction, it is the force sensor arranged upstream by considering the first direction of rotation, that will be solicited. Preferably, it is possible to combine the measurements coming from the two force sensors assembled with a load pre-stress in order to determine the new direction wherein the user has the intention to turn the button. The intention of the user is deduced therefrom, this intention is confirmed by the detection of a minimum torque. In this case, the magnetic field is cancelled, the apparent viscosity of the fluid is greatly reduced, the interaction element can therefore rotate in the second direction without feeling any sticking effect. It is as such possible to reproduce using the invention the operation of a free wheel.

FIGS. 5 and 6A to 6C show another embodiment of an interface 12 according to the invention comprising a frame 216, a brake 204, a proof body 226 having the shape of a wheel and an element for interaction with the user 201, with the element for interaction with the fluid not shown.

The wheel comprises a hub 228, an outer ring 232 and spokes 230 connecting the hub 228 to the outer ring 232.

In this example, the hub 228 is secured to the case of the interface for example by screws axially passing through the hub 228 and the outer ring 232 is secured to the frame for example by screws axially passing through the outer ring.

Two force sensors 240.1, 240.2 are arranged each bearing against a spoke 230 and arranged in relation to the spokes in such a way that, when the proof body 226 is solicited in a direction of rotation, a single one of the sensors is solicited. The force sensors are fixed onto the frame 216 and bearing against a face of a spoke 230. As an alternative, the force sensors could be assembled with a load pre-stress, or, as was mentioned hereinabove, be replaced with elongation gauges arranged on the proof body and which detect the deformation for example of the spokes under the effect of the torsion torque. More generally the force sensors can be replaced with deformation sensors.

Figure 5:
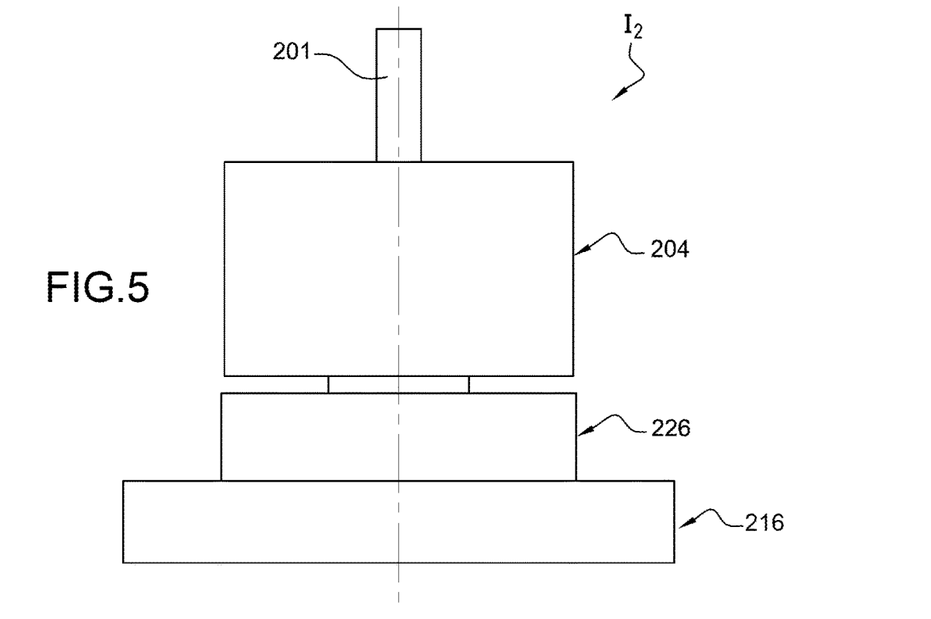
FIG. 5 is a side view of another example of a haptic interface.
Figure 6A:
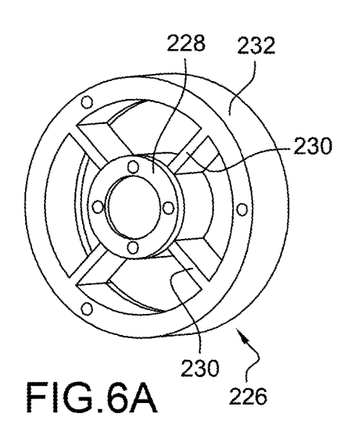
FIGS. 6A to 6C are different views of the proof body implemented in the interface of FIG. 5, FIGS. 7 to 11 graphically show settings in relation to the angular position in degrees in order to produce different haptic patterns.
Figure 6B:
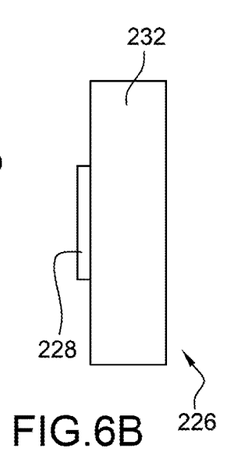
Figure 6C:
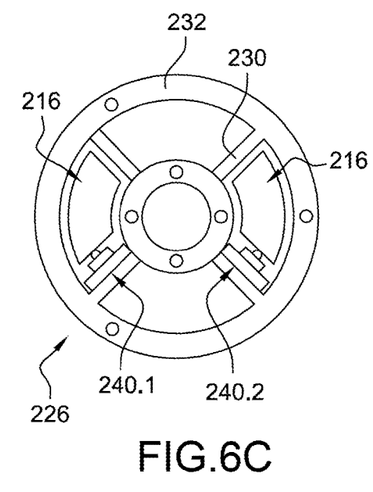

The operation of this device is similar to that of the device of FIG. 1 described hereinabove.

Means that make it possible to apply mechanical stresses on the proof body, such as means for guiding in rotation or in translation, can advantageously be added, which makes it possible to reduce the number of force sensors by assembling the latter with a load pre-stress.

The data coming from the force or deformation sensors is processed by an electronic system in order to determine if the torque exerted by the user on the interface exceeds a predetermined threshold. The torque sign is also determined and makes it possible to know the direction wherein the user has the intention to move the button.

As has been indicated hereinabove, knowing the actual value of the torsion torque is not necessary, knowledge of the direction of torsion is sufficient. Low-cost sensors can as such be implemented which make it possible to detect at least a binary threshold or a monotonous function of the force or of the deformation, outside of any specifications of the linearity, dynamic, resolution, etc. type, in that the sensor is sufficiently sensitive to detect a minimum torque acting on the interface without there being any putting into rotation of the latter. The sensor is also such that it is able to maintain a maximum force without degradation.

The motor M is intended to directly move the shaft 2 and therefore the button with low torque, without this representing a danger for the user. Indeed, the motor is not intended to apply very high torques. As such the motor can have a small size which facilitates the integration of the motor into the interface and to create and interface of reduced size. Furthermore, since the motor is not intended to operate constantly, the electrical consumption of the interface is reduced with respect to a haptic interface that uses only an electric motor.

Moreover, the haptic interface according to the invention makes it possible to generate a large number of haptic patterns. For the purposes of information, some of them shall be described hereinbelow, but this is not a complete description of the haptic patterns that can be created by the interface according to the invention.

As described hereinabove, the interface comprises seals 13 in order to provide for the seal of the chamber containing the magneto-rheological fluid. These seals exert friction on the shaft 2, generating an idling torque that is detrimental to the haptic perceived.

The motor can advantageously be controlled in order to offset this idling torque. For example, it is controlled in order to assist with the moving in rotation of the button. The motor M can be activated in order to offset the idling torque when no magnetic field is applied to the magneto-rheological fluid. For example, during the designing of the interface, the idling torque is measured or estimated, and the control unit is programmed to control the motor in such a way that it offsets this idling torque.

Very advantageously, the haptic feeling can be substantially improved by controlling the motor using the knowledge of the intention of the user. Indeed as soon as this intention is detected, the motor is activated to offset the idling torque, as such the user can never feel this idling torque that is inherent with the friction of the seals. Knowledge of the intention of the action of the user is also beneficial in the case of operating modes that implement both the magneto-rheological brake and the motor, with the controlling of these elements being carried out in a more reactive manner, the transitions are perceived less by the user.

The motor can also be actuated in order to generate a vibration, which is transmitted to the actuating shaft since the two shafts are linked in rotation, this vibration giving for example a haptic indication of the alert type.

Furthermore, it is possible to reproduce the spring effect, for example the sensation felt when manipulating a spring, for example a spiral spring, on an axis in rotation. It can be desired to reproduce this effect, for example in order to return the button to a stable position.

The interface is controlled in order to exert, according to the direction of rotation and the angular position, a force countering the rotation of the button or a return force on the button.

A spring is characterised by a stiffness k.

Figure 7:
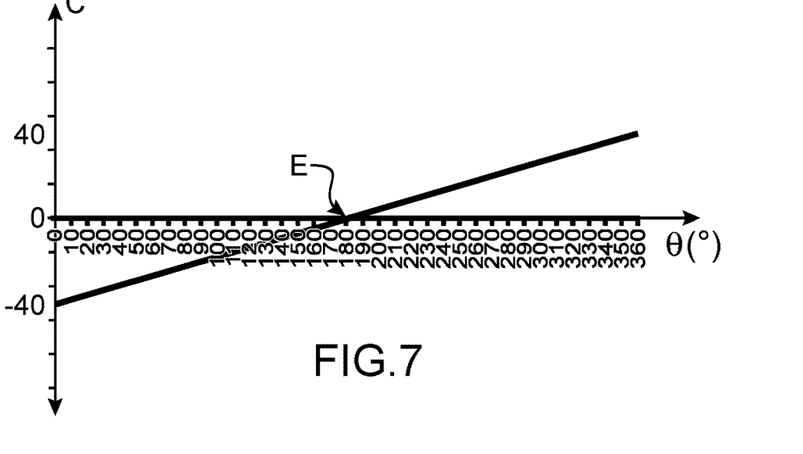

The control unit generates orders for the means for generating the magnetic field and for the motor in order to apply to the button the setting shown in FIG. 7, the setting is a linear function of which the zero value corresponds to a stable position of the spring of which it is desired to simulate the action on the button, i.e. the rest position thereof. FIG. 7 shows the variation in the setting S according to the angle of rotation θ, which is here in degrees.

The angle de 180° corresponds to the stable position or rest state of the spring to be simulated.

The orders generated depend on the angular position of the button and on the direction of rotation. Indeed, the more we move away from the stable position E, the greater the force opposing the movement of the actuating shaft is. When the direction of rotation approaches the button of the stable position, a return force is felt by the user. The sign of the force to be applied to the element for interaction with the user depends on the direction of rotation.

The haptic pattern of a spring can be obtained using different controls.

According to a first operating mode, the motor is able to deliver a sufficient torque for simulating the spring effect, only the motor is then controlled. The haptic pattern is programmes in such a way that the angle of 180° is considered as the stable position E or rest state of the spring. When the button is rotated by moving away from the position E, the motor is controlled in order to generate a resistive torque to this rotation. The intensity of this torque depends on the difference between the "rest" position and the current position of the button. The greater this difference is, the greater the torque generated by the motor will be, as such simulating the elastic return. If the user releases the button, the torque exerted by the motor will tend to return the button to its rest position E. The more the latter approaches E, the less the torque exerted by the motor is. In the end, the button returns to the initial position E, the controlling of the motor becomes zero and the residual friction of the system immobilising the interface.

According to another operating mode, the magneto-rheological brake is controlled to generate the resistive torque when the button is rotated from its balanced position. The motor is controlled in order to bring the button into its balanced position, when the force on the button is released, or when it is less than the return force of the spring.

It will be understood that the angle values are provided solely by way of example and are in no way limiting.

Figure 8:
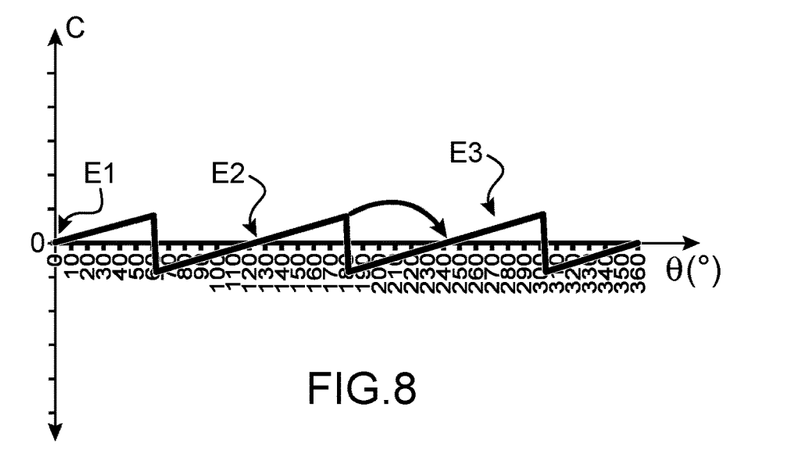

FIG. 8 shows a haptic pattern intended to reproduce the behaviour of an indexing type with three positions by considering an operating mode that uses the motor alone.

This button operates in the following way. When the user exerts sufficient torque on the button, the latter passes a notch and takes the next balanced position.

The balanced positions are designated as E1, E2, E3.

When the button is moved away for example from the balanced position E2, i.e. it is pivoted in the clockwise or anti-clockwise direction starting from an angle of 120° without however pivoting to reach the angle 180° or 60° respectively, it returns to its second balanced position E2 under the action of the motor M. For example when the button reaches the position of 180°, a notch is simulated and the button passes to the third balanced position E3 thanks to the action of the motor which is now controlled with a torque that depends on the reference relative to the position E3, and which drives the button to the balanced position E3. This passing from the position at 180° to the position at 240° is diagrammed by the arrow F.

Figure 9:
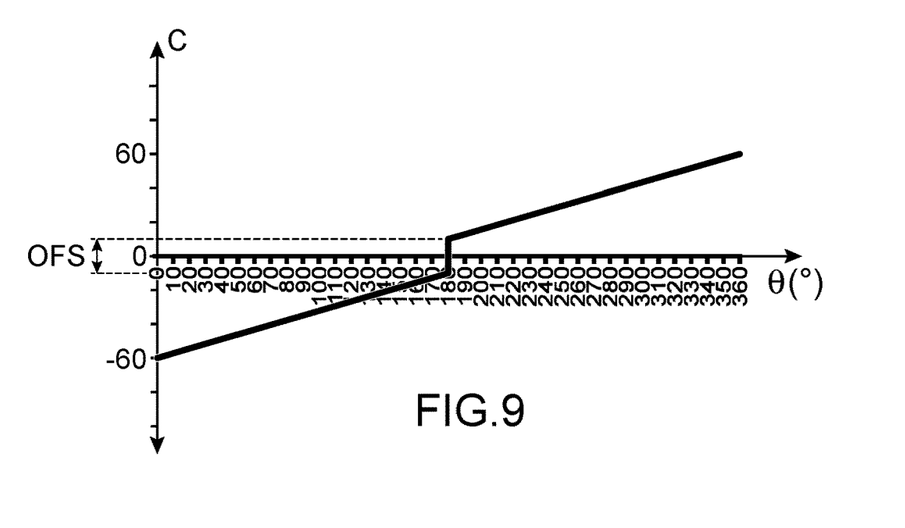

It may be that instabilities are produced around the stable position or positions stables. For example, according to the motor implemented jerky movements or an absence of movement can appear when a small force is controlled which would be of a magnitude of the internal friction of the interface. By providing a jump in the force or offset OFS (shown in FIG. 9) that is sufficient on the balanced position, the motor is controlled to generate a force greater than the internal friction of the interface.

Figure 10:
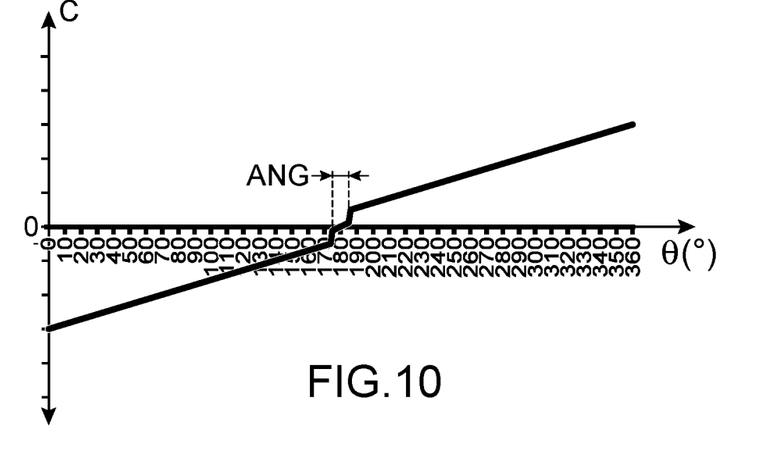

FIG. 10 shows the controlling of another haptic pattern wherein is provided in addition to the offset OFS an angular range ANG around the balanced position E wherein no force is generated by the motor and the brake. The stability of the interface around the balanced position is further improved in relation to that controlled with the setting of FIG. 9.

Figure 11:
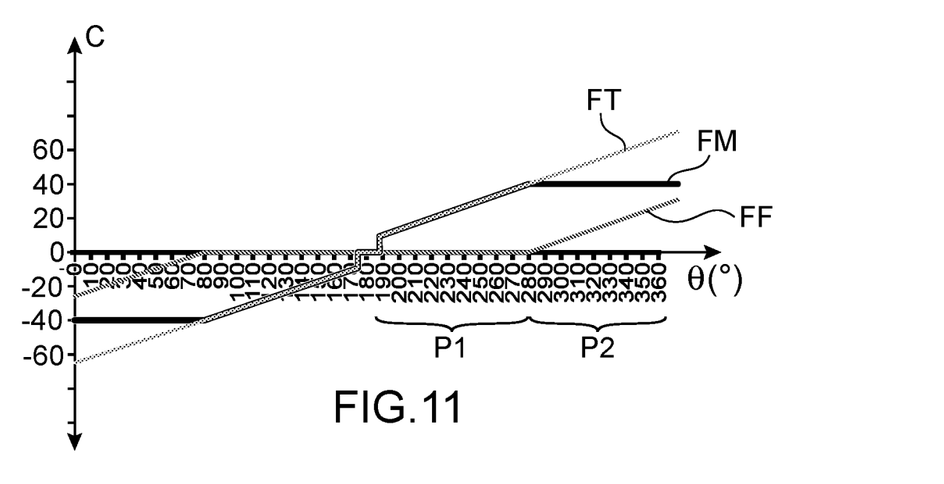

In FIG. 11, it is possible to see the setting of a haptic pattern which is applied to the motor and to the brake. As has been explained hereinabove, the motor is preferably adapted to the application of low torques while the brake can apply substantial torques. It can then advantageously be provided to control the motor so, that it applies alone on a first angular range P1 the resistive force, over the range [180°; 280°] in the example shown, then over a second angular range P2, the brake is also activated in order to apply an additional resistive force that is added to that generated by the motor.

The force applied by the motor is designated as $F_M$ and the force applied by the brake is designated as $F_B$ and the total force is designated as $F_T$.

The implementation of the motor and of the brake makes it possible to minimise abrupt transitions and increase the fluidity of the haptic interaction. The haptic interaction is then approved and the transparency of the interaction is increased.

It will be understood that this type of setting cannot be applied in a perfectly symmetrical way in the simulation of a spring, because the brake cannot simulate a return force on the second range P2. Despite the dissymmetry of the profile obtained, since it is the force $F_T$ which is generated if the user moves the button against the spring, and it is the force $F_M$ which is generated if the user releases his action, the haptic feeling remains sufficient to be assimilated to a spring with high stiffness.

Figure 12:
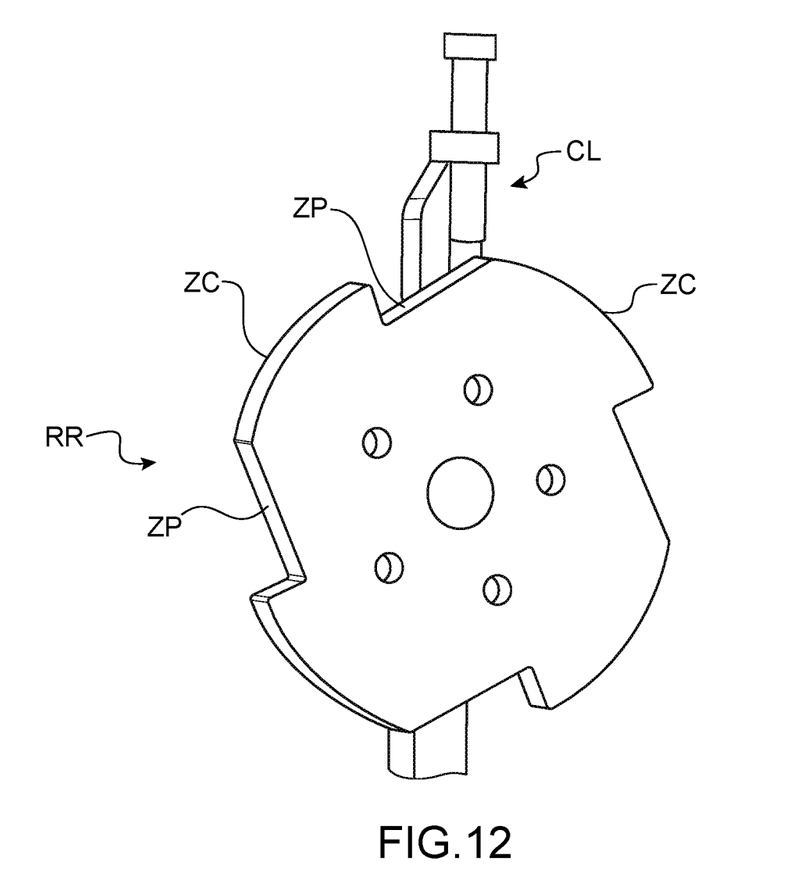
FIG. 12 is a front view of a ratchet wheel and of its ratchet, with the movement of the ratchet able to be reproduced by the haptic interface according to the invention.

The haptic interface according to the invention can also make it possible to reproduce the movement of a ratchet CL along a ratchet wheel RR shown in FIG. 12.

The end of the ratchet CL is moved on the external periphery of the ratchet wheel RR which comprises an alternation of flat zones ZP and of concave zones ZC, with a concave zone being connected to a flat zone by a radial plane RP extending along a spoke of the wheel. A flat zone ZP is connected to a concave zone ZC by an acute angle. When the ratchet is moves on the periphery of the ratchet wheel in the clockwise direction or the wheel is moved in relation to ratchet CL in the anticlockwise direction, it slides for example on a concave zone ZC, for this the brake is controlled in order to create viscous friction. In order to reproduce the movement of the ratchet on a flat zone ZP, the motor and/or the brake are controlled in order to simulate a spring effect. If the ratchet CL is moved in the anticlockwise direction or the wheel is moved in the clockwise direction, a virtual abutment is to be simulated when the ratchet comes into contact with the radial plane. For this the brake and/or the motor are controlled in order to generate a force that is sufficient to simulate an abutment.

Very advantageously, the haptic interface according to the invention can be used to simulate a system requiring an absolute representation of the position. Indeed, the motor can be controlled in order to return the button to a desired position. For example, in the case of a rotating haptic interface simulating a rotating contactor having different notches and comprising a button that has a mark or a visual marker. If the power of the interface is interrupted and the user manoeuvres the interface, during the resuming of the power the motor can reposition the button in its position before the power cut-off. In the absence of a motor, the interface cannot be repositioned. This will then result in an offset between the mark or visual marker of the button perceived by the user and the position of the interface expected by the haptic model.

The controlling of the system can be carried out in the following way. The current position of the button is stored in a regular manner in the control electronics. This can be carried out by the storing of this information in a non-volatile memory. In case of an electrical power cut-off, the system as such has a memorisation of the last position of the button. When the power resumes, the control electronics are initialised then compares the current position of the button with the last position recorded in the non-volatile memory. The electric motor is then controlled for example at a constant speed, until the position of the button is equal to the memorised position. The motor is then stopped and the interface becomes operational. As an alternative, it is possible to generate a control of the "spring effect" type of which the stable position corresponds to the last position recorded in the non-volatile memory. The button then returns to its last position as if it has been actuated by a return spring.

It will be understood that the examples of haptic patterns described are non-limiting examples.

The invention claimed is:

1. A haptic interface comprising:
 a first element configured to interact with a user and configured to be moved in a first direction and in a second direction;
 a second element configured to interact with a fluid of which viscosity varies according to an external stimulus, the second element being secured at least in translation or at least in rotation to the first element;
 a sensor configured to measure a current angular position of the first element;
 an actuator configured to determine a direction of rotation of the first element;
 a brake comprising a fluid of which apparent viscosity varies according to an external stimulus and a system configured to generate the stimulus on control in the fluid, with the second element being arranged in the fluid;
 a rotating electromechanical device comprising a shaft secured in rotation to the first element, the shaft of the rotating electrical mechanical device, the first element, and the second element being coaxial;
 a controller configured to generate orders for the system to generate the stimulus to modify a value of the stimulus, and for the rotating electromechanical device;
 a detector configured to detect torque exerted by a user on the first element, in a case of the first element being mobile in rotation, to know a direction of torque and if the torque is greater than a given value for a given direction, with the controller controlling the system that generates the stimulus based on information obtained on the torque at least when a zero or low speed of the element for interaction with the user is detected, the detector including a cylindrical proof body that is coaxial with the rotating electrical mechanical device and that is configured to deform in response to the torque, the cylindrical proof body including one end fixed to the brake and another end fixed to a frame of the haptic interface.

2. The haptic interface according to claim 1, wherein the rotating electromechanical device comprises an electric motor.

3. The haptic interface according to claim 1, wherein the actuator configured to determine the direction of rotation of the element for interaction with the user is formed by the detector configured to detect the torque exerted by a user on the element for interaction with the user or use temporal variations of the sensor configured to measure a current angular position of the first element.

4. The haptic interface according to claim 1, wherein the controller is configured to generate orders for the rotating electromechanical device to bring the first element into at least one given position.

5. The haptic interface according to claim 1, wherein the controller is configured to generate orders for the rotating electromechanical device and for the system that generates the stimulus such that they act simultaneously on the first element.

6. The haptic interface according to claim 1, wherein the controller is configured to generate orders for the rotating electromechanical device to apply a torque to the first element that offsets friction applied to the first element.

7. The haptic interface according to claim 1, wherein the controller is configured to generate orders for the rotating electromechanical device and for the system that generates the stimulus such that, from at least one given angular position of the first element, the system that generates the stimulus acts and/or the rotating electromechanical device act on the first element, when the first element rotates in the first direction and in the second direction opposite the first direction, to oppose the rotation of the first element, and such that the rotating electromechanical device assists the rotation of the first element at least when the latter is pivoted in the first direction or the second direction towards the given angular position.

8. The haptic interface according to claim 7, wherein the controller is configured so that, when the first element is in the given angular position, it generates orders for the rotating electromechanical device and/or for the system that generates the stimulus to apply a non-zero force on the first element.

9. The haptic interface according to claim 7, wherein the controller is configured so that, when the first element is in an angular zone on either side of the given angular position, it generates orders for the rotating electromechanical device and/or for the system that generates the stimulus to not apply any force on the first element.

10. The haptic interface according to claim 9, wherein the controller is configured so that, when the first element is at ends of the angular zone, it generates orders for the rotating electromechanical device and/or for the system that generates the stimulus to apply a force on the first element.

11. The haptic interface according to claim 1, wherein the detector configured to detect the torque or the force applied by the user on the first element comprises at least one force sensor.

12. The haptic interface according to claim 1, wherein the fluid is a magneto-rheological fluid, with the stimulus being a magnetic field.

13. A method for controlling a haptic interface according to claim 1, comprising:
 measuring a first current position of the first element;
 recording the current position in a non-volatile memory;
 measuring a second current position of the first element;
 comparing the second current position and the first current position;
 controlling the rotating electromechanical device so that the second current position corresponds to the first current position.

14. The method according to claim 13, wherein measuring the second current position of the first element is carried out after an interruption in the electrical power of the controller.

15. A method for controlling a haptic interface according to claim 1, with a purpose of reproducing a haptic pattern of a spring effect, comprising:

measuring a current position of the first element;
determining a direction of rotation of the first element;
controlling the rotating electromechanical device to apply a force in the direction of movement of the first element; or
controlling the rotating electromechanical device and/or the system that generates the stimulus to apply a force that opposes movement of the first element.

16. A method for controlling a haptic interface according to claim 1, comprising:
controlling a rotating electromechanical device to apply a force in a direction of movement of the first element such that the rotating electromechanical device applies a torque that offsets an idling torque exerted on the first element.

17. A method for controlling a haptic interface according to claim 1, comprising:
determining the speed of the first element from information provided by the sensor configured to measure the current position on the first element;
determining torque applied to the first element;
determining a current position of the first element;
if the speed is greater than a given speed, the direction of rotation is that given by the speed and the system that generates a stimulus is controlled to apply the recorded haptic pattern for the determined current position and for the determined direction of rotation;
if the speed is less than a given speed and if the torque or the force is greater than a positive threshold value or less than a negative threshold value, the direction of movement of the first element is deduced from the determined torque or force, and the system that generates a stimulus is controlled to apply a stimulus according to the haptic pattern recorded for this current position and for the deduced direction of movement.

18. The method according to claim 17, wherein when the determined torque is less than a given value, no stimulus is applied to the fluid.

\* \* \* \* \*